United States Patent
Simonen et al.

(10) Patent No.: US 6,577,719 B2
(45) Date of Patent: Jun. 10, 2003

(54) METHOD AND SYSTEM FOR THE PROCESSING OF TARIFF DATA

(75) Inventors: Ari-Pekka Simonen, Jyvaskyla (FI); Timo Juhani Salonen, Uurainen (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/825,763

(22) Filed: Apr. 4, 2001

(65) Prior Publication Data

US 2001/0050982 A1 Dec. 13, 2001

Related U.S. Application Data

(63) Continuation of application No. PCT/FI99/00833, filed on Oct. 6, 1999.

(30) Foreign Application Priority Data

Oct. 7, 1998 (FI) .................................................. 982181

(51) Int. Cl.$^7$ ............................................ H04M 15/00
(52) U.S. Cl. .............. 379/126; 379/114.05; 379/114.06
(58) Field of Search ...................... 379/126, 114.05, 379/114.22, 111, 114.21, 114.28, 121.05, 133

(56) References Cited

U.S. PATENT DOCUMENTS

| | | | |
|---|---|---|---|
| 5,381,467 A | * | 1/1995 | Rosinski et al. |
| 5,511,113 A | | 4/1996 | Tasaki et al. |
| 5,822,411 A | * | 10/1998 | Swale et al. |
| 5,943,320 A | | 8/1999 | Weik et al. |
| 6,134,306 A | * | 10/2000 | Lautenschlager et al. |
| 6,205,210 B1 | * | 3/2001 | Rainey et al. |
| 6,259,777 B1 | * | 7/2001 | Kawecki et al. |

FOREIGN PATENT DOCUMENTS

| | | |
|---|---|---|
| EP | 0 779 733 | 6/1997 |
| WO | WO 96/03000 | 2/1996 |

\* cited by examiner

*Primary Examiner*—Rexford Barnie
*Assistant Examiner*—Barry W Taylor
(74) *Attorney, Agent, or Firm*—Squire, Sanders & Dempsey L.L.P.

(57) ABSTRACT

Method and system for processing charge messages in a telecommunication system comprising a registering point for distinguishing received charge messages from each other, a first telephone exchange connected to a calling subscriber and a second telephone exchange connected to a called subscriber, said telephone exchange using charge calculation based on charge messages of the originating and terminating side, a charge message being sent during call set-up from the originating side to the registering point. A charge message received from the terminating side is checked; the charge data or the originating side and terminating side are combined if they bear similarities; the charge message is modified to from a replacing charge message that contains the combined charge data; and the replacing charge message is sent to the registering point.

12 Claims, 2 Drawing Sheets

METHOD AND SYSTEM FOR THE PROCESSING OF TARIFF DATA

Figure 1:
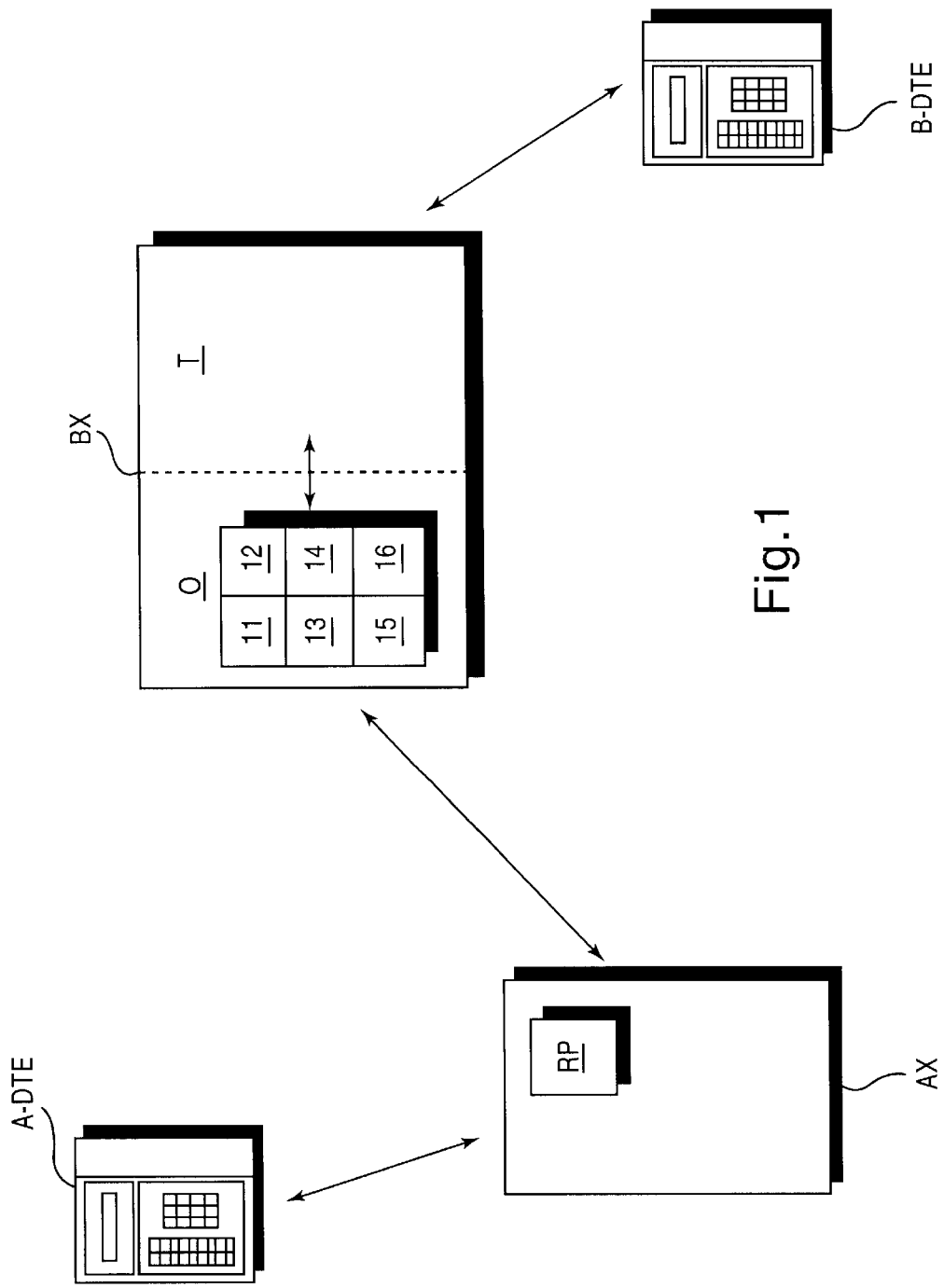

This application is a continuation of international application serial number PCT/FI99/00833, filed Oct. 6, 1999.

The present invention relates to the processing of tariff data for a telecommunication connection. In particular, the invention concerns a new and Improved method and system for the transmission of charge data to a registering point.

BACKGROUND OF THE INVENTION

A prior-art method for charging for a telecommunication connection is based on CHG messages (CHarGe message). CHG messages are used to transmit call tariff information, which is stored in charging records (CDR). This method is used e.g. in ISDN networks and it necessitates the use of ISUP2 signalling (ISUP2, ISDN user part, version 2). The charge message is a tariff message generated in the B-subscriber's telephone exchange and transmitted to the registering point during call set-up. The registering point is often the A-subscriber's telephone exchange. It may also be a telephone exchange between two networks or any ocher telephone exchange to which the subscribers are connected. In this context, A-subscriber means the committer of the connection, and B-subscriber means the subscriber with whom a connection is to be set up.

To verity that the charge data have been received at the registering point and that the registering point has approved them, an acknowledgement or CHGA (CHarGe Acknowledgement) message is sent to the network element which sent the charge message. If the network element which has sent a CHG message does not receive a CHGA message within a certain length of time, then the telecommunication connection is disconnected.

The charge data can be changed during the connection by sending a replacing charge message (replacing CHG tariff) to the registering point. This message transmitted to the registering point contains a new value and an indicator specifying the quantity to be replaced with the new value. The CHG messages are transmitted through all the telephone exchanges along the connection to the registering point, which stores them for use in calculation. A signalling point code included in the charge message is used in acknowledging the message to direct the acknowledgement to the exchange which sent the charge message. The signalling point code contains the addresses of the receiving network element and the network element which has sent the message. Moreover, charge messages contain an indication of the tariff category to be used, of which there is a limited number in use.

From the charge and call data accumulated at the registering point, a charging center later calculates the price to be charged to the subscriber.

In call set-up referred to above, problems are encountered in situations where charge messages of the same tariff category are sent from both the originating and terminating sides. In a call for which charge messages are generated on the originating and terminating sides of the same network element, the signalling point codes for the messages are the same. If the tariff categories of the messages are also the same, then the registering point is unable to distinguish the messages from each ocher and the call is disconnected.

The object of the present invention is to eliminate the drawbacks described above or at least to significantly alleviate them.

A specific object of the present invention is to disclose a new type of method and system for transmitting charge messages to a registering point an a situation where messages are sent from the originating and terminating sides of the called subscriber's telephone exchange.

BRIEF DESCRIPTION OF THE INVENTION

The present invention concerns a method for the processing of CHG messages (CHarGe messages) in a telecommunication system. This telecommunication system comprises a registering point where received charge messages are distinguished from each other e.g. on the basis of tariff category and signaling point code. Moreover, the system comprises a first telephone exchange, to which the A-subscriber is connected, and a second telephone exchange, to which the B-subscriber is connected. The second telephone exchange uses charge calculation based on charge messages of both the originating and terminating sides. In this charge calculation a charge message is sent from the originating side to the registering point during the establishment of the connection. In the method of the invention, a charge message received on the originating side from the terminating side is checked and the charge data for the originating and terminating sides are combined if they bear a similarity to each other. After this, according to the invention, the charge message is modified to form a replacing charge message containing the combined charge data, and the message is sent to the registering point.

In an embodiment of the method, the tariff data sent in the charge message from the originating side to the registering point and the tariff data sent in the charge message from the terminating side are added together if the tariff categories of these messages are the same. The sum is sent in the replacing charge message to the registering point.

In a preferred embodiment, an acknowledgement message is sent from the originating side to the terminating side after the registering point has acknowledged edged the replacing charge message sent from the originating side. This is done because the terminating side waits for an acknowledgement before continuing its functions in the normal manner.

According to the invention, all charge messages received by the originating side from the terminating side in which the charge data bear similarities to the charge data sent to the registering point can be combined. The registering point of the invention is preferably located in the first telephone exchange. The signalling used in the telecommunication network may be ISUP2 signalling (ISUP2, ISDN user part, version 2).

The invention also relates to a system for the processing of charge messages in a telecommunication system as described above. In the system of the invention, the originating side of the second telephone exchange comprises means for checking a charge message sent by the terminating side and means for combining the charge data sent by the originating side to the registering point and the charge data received from the terminating side if the charge data sent by the terminating side bear similarities to the charge data sent from the originating side to the registering point. Moreover, the system of the invention comprises means for modifying the charge data so as to form a replacing charge message containing combined charge data and means for sending a replacing charge message to the registering point.

In a preferred embodiment of the invention, the originating side of the second telephone exchange comprises means for summing the tariff data sent to the registering point and the tariff data received from the terminating side when the tariff categories in the charge messages are the same. Moreover, the originating side of the second telephone exchange preferably comprises means for generating an acknowledgement message and sending it to the terminating side after the registering point has acknowledged the replacing charge message sent to it.

In a preferred embodiment of the invention, the originating side of the second telephone exchange comprises means for combining all charge messages received from the terminating side if the charge data bear similarities to the charge data sent to the registering point.

The registering point of the invention is preferably located in the first telephone exchange. The signaling used in the telecommunication network may be ISUP2 signalling.

The invention helps achieve a successful telecommunication connection. It prevents the occurrence of error situations and call setdown if charge messages with the same tariff categories are sent from both the originating and terminating sides of a network element. The invention also allows the introduction of new services using originating and terminating side calculation.

LIST OF ILLUSTRATIONS

Figure 2:
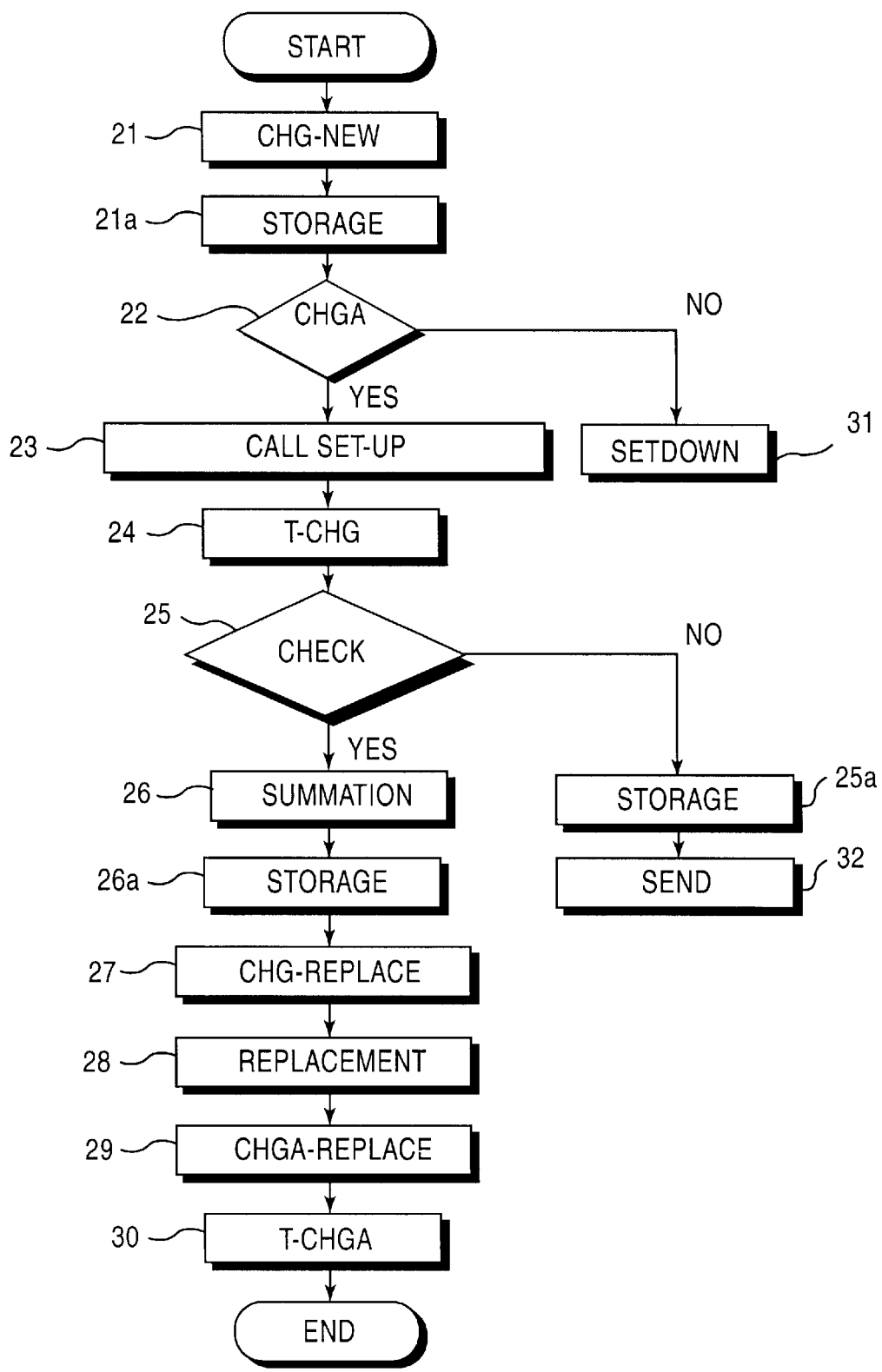

In the following, the invention will be described in detail by the aid of a few examples of its embodiments, wherein FIG. 1 presents an embodiment of the system of the invention, and FIG. 2 presents a functional block diagram of an embodiment as illustrated in FIG. 1.

DETAILED DESCRIPTION OF THE INVENTION

The system illustrated in FIG. 1 comprises A and B-subscribers' terminal devices A-DTE, B-DTE and A and B-subscribers' telephone exchanges AX, BX. In FIG. 1, the registering point RP is located in the A-subscriber's telephone exchange. In the registering point, received CHG messages (Charge messages) are distinguished from each other on the basis of tariff category and signalling point code. Thus, charge data received from different addresses are stored in different locations in the registering point. The subscriber is charged on the basis of the information in the registering point. In the B-subscriber's telephone exchange, both originating side and terminating side calculation is in use. Therefore, CHG messages are sent from both sides.

For the verification of charge data, the originating side comprises means 11. For the summing of tariff data, the originating side comprises means 12. For the modification and transmission of the message, the originating side comprises means 13, 14. In the case of the present example, these means 11, 12, 13, 14 are implemented in a manner known to the skilled person, e.g. using software, memory and electronics and mating small changes in existing technology. The originating side comprises means 15 for generating and sending a CHGA message of appropriate form. In the case of the example, these means are implemented in a manner known in itself and they will therefore not be described in greater detail.

In addition, the system presented in FIG. 1 comprises means 16 for summing all CHG messages received from the terminating side T of the B-subscriber's telephone exchange BX and having the same tariff category and the same signalling point code as in the message sent to the registering point RP These means are implemented in a manner known to the skilled person. In the telecommunication network in the example, ISUP2 signalling (ISUP2, ISDN user part, version 2) is used.

In the embodiment illustrated in FIG. 1, an A-subscriber calls a B-subscriber in an ISDN network in which the charging for the connection is effected on the basis of CHG messages. The events in the example are presenter in the block diagram in FIG. 2.

The A-subscriber, using his/her telecommunication terminal, calls the B-subscriber. During the call set-up, a CHG message containing charge data is sent from the B-subscriber's telephone exchange BX to the registering point RP, block 21. This message is first stored on the originating side, block 21a, and then transmitted from the originating side O of the exchange. Scoring the message ensures chat control of tariffs sent will remain with the originating side. After this, the originating side remains waiting for a CHGA message (CHGA, CHarGe Acknowledgement) from the registering point, block 22. If the originating side is receives an affirmative CHGA response, then a telecommunication connection can be set up between the subscribers, terminals, block 23. If no CHGA message is received within a certain length of time or if a negative one is received, then the call set-up procedure will be terminated, block 31. At a later stage of the call, the originating side can generate CHG tariff of the same tariff category as on the terminating side before. In this case, too, it must be possible to combine the tariffs and send them as a replacing tariff to the originating line.

Next, a CHG message is sent from the terminating side T of the B-subscriber's telephone exchange BX, which message is also transmitted to the originating side O, block 24. On the originating side, the message is checked to determine its tariff category, block 25. If the tariff category is the same as in the CHG message sent from the originating side during call set-up, then the message is not sent directly to the registering point RP but is first modified to give it the right form. At this point, the charge data of the received and sent messages are summed together, block 26. In addition the message is turned into a CHG update date message and stored on the originating side, block 26a, and this message is sent to the registering point block 27. If the tariff category differs from the tariff category of the message sent then the CHG message of the terminating side can be first scored on the originating side, block 25a, and then transmitted further, block 32, because the registering point will distinguish these messages from each other. When the originating side O receives a replacing tariff from the terminating side T a replacing tariff in which only the share of the terminating side tariff has been replaced must be sent to the originating connection. To make this possible, it is necessary for the originating side to separately maintain the originating side's own tariffs and the summed tariff of the originating/terminating side. Thus, in the summed tariff the replacing tariff received from the terminating side only replaces the share of the terminating side.

The registering point RP uses the CHG update message to replace the data of the CHG message received with the same signalling point code and tariff category. In the present example, the registering point thus replaces the old data with new summed tariff data of the originating and terminating sides, block 28. After the required changes have been accomplished, the registering point sends an affirmative CHGA acknowledgement message to the address indicated by the signalling point code, block 29. When the originating side O receives this message, it generates a CHGA message and sends it to the terminating side T, block 30. This CHGA message tells the terminating side whether the call set-up procedure can be continued or not. Having received an affirmative CHGA message from the originating side, the terminating side will continue the call set-up procedure in the normal manner.

The embodiment described in the example can be used e.g. in a "number transferability" service provided by a telecommunication network operator.

The invention is not restricted to the examples of its embodiments described above, but many variations are possible within the scope of the inventive idea defined in the claims.

What is claimed is:

1. A method for the processing of charge messages in a telecommunication system including:
   a registering point for sorting out received charge messages based on tariff category and signalling point code;
   a first telephone exchange to which a calling subscriber is connected; and
   a second telephone exchange to which a called subscriber is connected, the second telephone exchange including an originating side and a terminating side, the second telephone exchange using charge calculation based on charge messages from the originating side and the terminating side, the method comprising:
   sending a first charge message from the originating side to the registering point during set-up of a call, the first charge message including first call tariff data corresponding to the call;
   sending a second charge message from the terminating side to the originating side, the second charge message including second call tariff data corresponding to the call;
   comparing received second call tariff data to first call tariff data at the originating side;
   combining the first call tariff data and the second call tariff data if they bear similarities;
   forming a third charge message including the combined first call tariff data and the second call tariff data; and
   sending the third charge message to the registering point to replace the first charge message.

2. The method according to claim 1, further comprising adding the first tariff data sent in the first charge message from the originating side to the registering point and the second tariff data sent in the second charge message from the terminating side to form a sum of tariff data if the tariff category corresponding to these messages is identical; and
   sending the sum of tariff data in the third charge message to the registering point.

3. The method according to claim 1, further comprising sending an acknowledgement message from the originating side to the terminating side after the registering point has acknowledged the third charge message sent from originating side.

4. The method according to claim 1, combining all charge messages received by the originating side from the terminating side having charge data bearing similarities to charge data sent to the registering point.

5. The method according to claim 1, further comprising the registering point being located in the first telephone exchange.

6. The method according to claim 1, further comprising using ISUP2 signalling in the telecommunication system.

7. A system for the processing of charge messages in a telecommunication system including:
   a registering point for sorting out received charge messages based on tariff category and signalling point code;
   a first telephone exchange to which a calling subscriber is connected; and
   a second telephone exchange to which a called subscriber is connected, the second telephone exchange including an originating side and a terminating side, the second telephone exchange using charge calculation based on charge messages from the originating side and the terminating side, the method comprising:
   means for sending a first charge message from the originating side to the registering point during set-up of a call, the first charge message including first call tariff data corresponding to the call;
   means for sending a second charge message from the terminating side to the originating side, the second charge message including second call tariff data corresponding to the call;
   means for comparing received second call tariff data to the first call tariff data at the originating side;
   means for combining the first call tariff data and the second call tariff data if they bear similarities;
   means for forming a third charge message including combined first call tariff data and second call tariff data; and
   means for sending the third charge message to the registering point to replace the first charge message.

8. The system according to claim 7, wherein the originating side of the second telephone exchange comprises means for summing tariff data sent by the originating side to the registering point and tariff data received from the terminating side when tariff categories in charge messages are identical.

9. The system according to claim 7, wherein the originating side of the second telephone exchange comprises means for generating an acknowledgement message and sending the acknowledgement message to the terminating side after the registering point has acknowledged the third charge message sent from the originating side.

10. The system according to claim 7, wherein the originating side of the second telephone exchange comprises means for combining all charge messages received from the terminating side having charge data bearing similarities to charge data sent to the registering point.

11. The system according to claim 7, wherein the registering point is located in the first telephone exchange.

12. The system according to claim 7, wherein ISUP2 signalling is used in the telecommunication system.

* * * * *